Patented Oct. 19, 1948

2,451,735

UNITED STATES PATENT OFFICE 2,451,735

POLYENES AND PROCESS FOR THE MANUFACTURE THEREOF

Otto Isler, Basel, Switzerland, assignor to Hoffmann-La Roche Inc., Nutley, N. J., a corporation of New Jersey No Drawing. Application October 16, 1946, Serial No. 703,483. In Switzerland October 18, 1945

12 Claims. (Cl. 260—611)

This invention relates to the manufacture of pentaenes.

The constitution of vitamin A has been known since 1933 (Karrer, "Helvetica Chimica Acta," vol. 16, year 1933, page 557). Many experiments have since been undertaken with a view to obtaining substances possessing vitamin A activity. In 1942 it was, for instance, suggested to prepare compounds possessing the constitution of vitamin A from the aldehyde C₁₄H₂₂O [4-(2',6',6'-trimethyl-cyclohexene-(1')-yl)-2-methyl-butene-(2)-al-(1)] in the following manner (Heilbron, "Journal of the Chemical Society London," year 1942, page 727): Addition of acetylene and methyl-omega-alkoxy-ethyl-ketone or the condensation product thereof, respectively, aniono-tropic rearrangement, partial hydrogenation of the triple bond and splitting off of water at any stage of the synthesis. However, so far no substantial success in this respect has been reported. Similar processes for the manufacture of vitamin A ethers are claimed by N. Milas in U. S. patent specifications 2,369,157 and 2,382,086. However, a wrong structural formula is ascribed to the aldehyde C₁₄H₂₂O, and, consequently, it is not recognised that prior to splitting off water or acid, respectively, the condensation products must be subjected to an allyl rearrangement. The splitting off of water is striven for either by warming with p-toluene-sulphonic acid in toluene or by halogenating by means of phosphorus halogenide and splitting off of acid with alcoholic alkali. According to both these methods the allyl-rearrangement step—not recognised by the author—however, takes place only to a low degree and, consequently, only modest quantities of active vitamin A are obtained.

It has now been found, according to the present invention, that vitamin A-active compounds can be obtained by condensing 4-(2',6',6'-trimethyl-cyclohexene-(1')-yl)-2-methyl-butene-(2)-al-(1) by a Grignard reaction with an ether of 1-hydroxy-3-methyl-pentene-(2)-yne-(4), adding to the triple bond of the ether of 1-hydroxy-3,-7-dimethyl-6-hydroxy-9-trimethyl-cyclohexenyl-nonadiene-(2,7)-yne-(4) thus formed 1 mol of hydrogen by catalytical partial hydrogenation and warming the ether of 1-hydroxy-3,7-dimethyl-6-hydroxy-9-trimethyl-cyclohexenyl-nonatriene-(2,4,7) formed with a small portion of iodine, preferably in the presence of an inert solvent.

The synthesis may be illustrated by the following formulae:

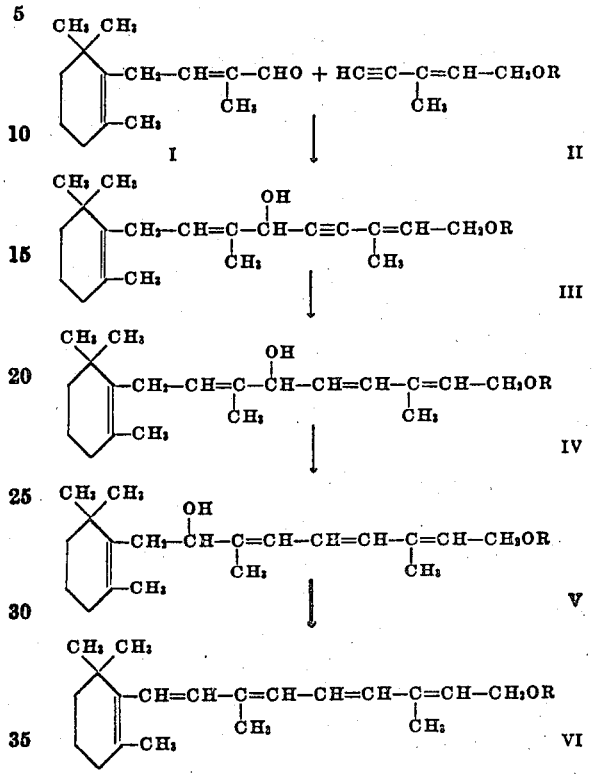

R=alkyl, aryl or aralkyl.

The synthesis of the vitamin A ethers, which all contain the system of five double bonds conjugated to one another, may thus be effected by uniting the two parts I and II to a condensation product III, carrying three double bonds and one triple bond, only two of which are conjugated to one another. Only in the course of the last reaction step, after previous partial hydrogenation of the triple bond and rearrangement of a double bond, the pentaene chain is formed from the said condensation product by splitting off water.

The starting materials required, viz.: 4-trimethyl-cyclohexenyl-2-methyl-butenal and the ethers of 1-hydroxy-3-methyl-pentene-(2)-yne-(4) may be prepared as follows:

4-trimethyl-cyclohexenyl - 2 - methyl - butene-(2)-al-(1) is obtained from β-ionone by glycide ester synthesis, saponification of the glycide ester formed, and decarboxylation of the glycide acid in vacuo in the presence of copper powder. The said aldehyde $C_{14}H_{22}O$ may be purified by way of the phenylsemicarbazone thereof having its melting point at 182° C. and may be regenerated therefrom just before use by heating with phthalic acid anhydride.

1-Alkoxy-3-methyl-pentene-(2)-yne-(4) is obtained by reacting 3-hydroxy-3-methyl-pentene-(1)-yne-(4) (the condensation product of methylvinylketone and acetylene) with acid and alcohol, the hydroxyl group is simultaneously etherified and shifted thereby. 1-Methoxy-3-methyl-pentene-(2)-yne-(4) is, for instance, formed in good yield by stirring 3-hydroxy-3-methyl-pentene-(1)-yne-(4) with 30 per cent. methyl-alcoholic sulphuric acid during 4 hours. The substance boils at 73-75° C. under a pressure of 100 mm. Hg; $n_D^{23°} = 1.455$.

1 - alkoxy-3-methyl-pentene-(2)-yne-(4) may also be prepared by halogenating 3-hydroxy-3-methyl-pentene-(1)-yne-(4) with phosphorus halides, and reacting the primary halide thus formed with sodium alcoholate. The phenyl and the benzyl ether may be prepared correspondingly. Furthermore, the phenyl ether may be obtained in good yield from the primary bromide by boiling with phenol in acetone in the presence of potassium carbonate.

The first step of the present process is a Grignard reaction by which ethers of 1-hydroxy-3-methyl-pentene-(2)-yne - (4) are first reacted with 1 mol of alkyl magnesium halide (for instance, ethyl magnesium bromide). The magnesium compound formed is condensed with 4-tri-methyl - cyclohexenyl - 2-methyl-butene-(2)-al-(1) in the manner known per se. The reaction takes place in one of the usual solvents, such as ethyl ether. The reaction product is hydrolised in the customary manner, for instance with an ammonium salt solution. Any parts of the aldehyde not having entered into reaction may be separated off in form of a crystallising derivative, for instance, as phenylsemicarbazone. However, the condensation products of formula III may more suitably be purified by distillation. They are viscous, yellowish oils, not absorbing ultraviolet rays of higher wave length than 260 mμ; the solution in arsenic trichloride is of violet colour. By Zerewitinoff analysis, the compounds prove to possess one active hydrogen atom.

The condensation product III, suitably after purification, is then partially hydrogenated at the triple bond. Palladium calcium carbonate and palladium barium sulphate may, for instance, be used as catalysts; for the selective hydrogenation of the triple bond, palladium charcoal, onto which quinoline has been adsorbed, is preferred. The introduction of hydrogen is stopped as soon as the calculated quantity of hydrogen has been taken up. It is not necessary to isolate and to purify the hydrogenation products. They are viscous, yellowish oils, not absorbing any ultraviolet rays of higher wave length than 260 mμ; their solution in arsenic trichloride or trichloro-acid-chloroform is of blue colour.

The condensation products IV formed by partial hydrogenation are treated with a means effecting a so-called allyl rearrangement, whereby a migration of the hydroxyl group in position 6 into position 8, in given cases with simultaneous substitution, and of the adjacent double bond into position 6 takes place. Water is then split off in order to effect introduction of a new double bond into compound V thus obtained. Any usual method may be employed, provided the desired pentaene (vitamin A ether) is stable under the reaction conditions.

A new and especially suitable method, by which the allyl rearrangement and the splitting off of water are effected in one single reaction step, consists in heating with a small portion of iodine in the presence of an inert solvent, such as toluene. The product corresponds to formula VI, the terminal functional group being an etherified hydroxyl group.

According to the present invention, the preparation of vitamin A methyl ether may, for instance, be carried out in the following manner: 4-(2',6',6'-trimethyl-cyclohexene - (1')-yl) - 2-methyl-butene-(2)-al-(1) is condensed by means of 1 mol of ethyl magnesium bromide with 1-methoxy-3-methyl-pentene-(2)-yne-(4). 1 mol of hydrogen is added to the triple bond of 1-methoxy-3,7-dimethyl-6-hydroxy - 9 - trimethyl-cyclohexenyl-nonadiene - (2,7) - yne-(4) formed, using palladium charcoal, onto which quinoline had been adsorbed before use, as catalyst. The tetraene thus obtained is boiled in the presence of iodine in an inert organic solvent.

According to the present process as above set forth, vitamin A ethers are obtained which possess the same biological activity as vitamin A and its derivatives obtained from natural sources. The products of the process are characterised by causing a maximum of absorption in ultraviolet spectrum at 328 mμ and by the colour reactions with antimony trichloride, arsenic trichloride, aluminum silicate and trichloro-acetic acid, specific to vitamin A.

The products of the process may be purified by the same methods as high concentrates of vitamin A and its derivatives from natural sources (separation between solvents, chromatographic adsorption, careful distillation, etc.). Like natural vitamin A, the products must be protected from the deteriorating effects of light, air and heat. It is advisable to add antioxidants; they may also be present during the different steps of the synthesis: Tocopherols are particularly suitable as antioxidants.

*Example 1*

13.5 parts by weight of 1-methoxy-3-methyl-pentene-(2)-yne-(4) in 30 parts by volume of ether are added during 1 hour while stirring in a nitrogen atmosphere to a solution of ethyl-magnesiumbromide, previously prepared from 3 parts by weight of magnesium and 14 parts by weight of ethyl-bromide in the presence of 30 parts by volume of ether. During the addition, the reaction solution must be kept slightly boiling. Thereafter, the mixture is refluxed for 4 hours. The resulting magnesium-bromide compound of the methyl-pentenyne is partly deposited as a gray smear. The mixture is left to cool and then a solution of 18 parts by weight of 4-(2',6',6'-trimethyl-cyclo-hexene - (1')-yl) - 2-methyl-butene-(2)-al-(1) in 60 parts by volume of ether is added in the course of 1 hour. The temperature of the reaction mixture rises thereby and the deposit is dissolved. The solution is stirred overnight and then refluxed for 2 hours. Subsequently, it is diluted with ether, whereafter a 20 per cent. ammonium-nitrate solution is added while cooling. After washing with water and drying, the ether is boiled off. Parts of the aldehyde which have not taken part in the reaction are precipitated as phenylsemicarbazone by a methyl-alcoholic solution of phenylsemicarbazide. The desired condensation product is isolated from the methyl-alcoholic solution and fractionated in a short-way distillation apparatus. Pure 1-methoxy - 3,7 - dimethyl-6-hydroxy-9-trimethyl-cyclohexenyl-nonadiene - (2,7) - yne-(4) distils over at 145° C. and at a pressure of $10^{-4}$ mm. Hg. The yield, calculated for the aldehyde, amounts to 80–90 per cent.

10 parts by weight of 1-methoxy-3,7-dimethyl-6 - hydroxy - 9 - trimethyl - cyclohexenyl - nonadiene-(2,7)-yne-(4) are dissolved in 100 parts by volume of methyl alcohol, digested with 0.5 part by weight of animal charcoal, and filtered, whereupon the coal is washed with 30 parts by volume of methyl alcohol. 1 part by weight of 4 per cent. palladium charcoal, onto which 0.1 part by weight of quinoline has previously been adsorbed, is added to the filtrate. The mixture is allowed to take up 1 mol, i. e., 700 parts by volume, of hydrogen in a hydrogenation apparatus at room temperature without extra pressure. Towards the end of the reaction, the hydrogen absorption gradually slows down. The catalyst is filtered off, washed with little methyl alcohol, whereupon 300 parts of water are added to the filtrate. The hydrogenation product separates and is taken up in petroleum ether, washed with water and concentrated.

The 1-methoxy-3,7-dimethyl-6-hydroxy-9-trimethyl-cyclo-hexenyl-nonatriene-(2,4,7) thus obtained (about 10 parts by weight) is dissolved in 100 parts by weight of xylol, and refluxed in an inert atmosphere; 0.1 part by weight of pure, crystallised iodine is added in the course of 1 hour. The iodine is dissolved with brown colour. Splitting off of water immediately sets in. The mixture is refluxed for a further hour, diluted with petroleum ether after cooling and decolourised by addition of a 1 per cent. solution of thiosulphate. The solvent is driven off in vacuo, whereupon the residue is fractionated in an apparatus for molecular distillation and then chromatographed onto an aluminum column with petroleum ether. After addition of alcohol an eluate is obtained from the main zone of the chromatogram, which shows greenish fluorescence in the light of the quartz lamp, representing a concentrate of vitamin A methyl ether, distilling at 80–90° C. under a pressure of $10^{-4}$ mm. Hg.

The product thus obtained produces the absorption maximum at 328 m$\mu$ in ultraviolet light which is characteristic for vitamin A and exerts marked vitamin A activity if fed to rats deficient in this vitamin.

*Example 2*

4.5 parts by weight of 1-methoxy-3-methyl-pentene-(2)-yne-(4)- in 10 parts by volume of ether are added in the course of one half hour, while stirring in a nitrogen atmosphere, to a solution of ethylmagnesiumbromide, previously prepared from 1 part by weight of magnesium-chips and 4.6 parts by weight of ethyl-bromide in 20 parts by volume of ether. Thereupon, the mixture is refluxed for 2 hours, left to cool down, and a solution of 6 parts by weight of 4-trimethyl-cyclohexenyl-2-methyl-butene-(2) - al - (1) in 12 parts by volume of ether is added in the course of one half hour. The mixture is stirred for 2 hours at room temperature, whereupon it is refluxed for 2 hours. It is then left to cool down and the clear reaction solution is poured into a mixture of 10 parts by weight of ammonium chloride and 50 parts by weight of ice. The hydrolised condensation product is taken up in ether, washed with water and dried with sodium sulphate, the solvent is evaporated and the residue fractionated, 8 parts by weight of 1-methoxy-3,7-dimethyl-6-hydroxy-9-trimethyl - cyclohexenyl - nonadiene-(2,7)-yne-(4) of boiling point 161–163° C. under a pressure of 0.05 mm. Hg are obtained.

10 parts by weight of this condensation product are dissolved in 100 parts by volume of methyl alcohol by means of 0.5 part by weight of 2 per cent. palladium charcoal, onto which 0.25 part by weight of quinoline have previously been adsorbed. It is suitable to add 0.05 part by weight of tocopherol as antioxidant already before hydrogenation. After 1 mol of hydrogen has been taken up the hydrogenation is interrupted, the catalyst sucked off, the filtrate concentrated and the residue fractionated. 9.6 parts by weight of 1-methoxy-3,7-dimethyl-6-hydroxy-9 - trimethyl cyclohexenyl-nonatriene-(2,4,7) of boiling point 151–153° C. under a pressure of 0.05 mm. Hg are obtained.

10 parts by weight of the latter compound are boiled in 200 parts by volume of petroleum ether of boiling point 80–110° C. while introducing nitrogen and stirring under reflux. In the course of 10 minutes a solution of 0.15 part by weight of iodine in 50 parts by volume of petroleum ether (of boiling point 80–110° C.) is added. Stirring under reflux is continued for further 20 minutes, whereupon the mixture is left to cool down and diluted with petroleum ether of boiling point 30–60° C. The mixture is washed with sodium-thiosulphate solution and 95 per cent methyl alcohol. The vitamin A methylether formed remains in the petroleum ether, whereas the unchanged starting material (about 4 parts by weight) migrates into the 95 per cent. methyl alcohol. The material insoluble in methyl alcohol is isolated by the usual methods and then again, exactly in the same manner, reacted with iodine in boiling petroleum ether. The petroleumether-solutions, containing the vitamin A methyl ether, are washed with water, dried with sodium sulphate and evaporated. By repeated treatment with iodine in boiling petroleum ether 8.0 to 9.6 parts by weight of the crude product, having a content of vitamin A methyl ether of 20–30 per cent., are obtained as residue from the petroleum ether solution. The crude product is obtained in a yield of about 90 per cent.; the yield of vitamin A methyl ether amounts to about 25 per cent.

The preparation of the pure substance, possessing the absorption spectrum specific to vitamin A, from the said 20–30 per cent. crude product may be carried out, for instance, by chromatographic percolation by means of petroleum ether (boiling point 60–80° C.) through columns of aluminum oxide of low activity. Thereby, intermediate products with a free hydroxy group adhere to the aluminum oxide, whereas by-products absorbing light of shorter wave length (280–290 m$\mu$) are less adsorbed and, consequently, get enriched in the first runnings. The vitamin A methyl ether itself passes slowly through the column, whereby its position can easily be detected by the intensive yellowish-green fluorescence in the ultraviolet light. The good fraction is characterised by the stability of the Carr-Price-colour reaction and by the fact that the residue thereof shows a refraction $n_D^{20}$ higher than 1.60. The vitamin A methyl ether boils at 90–95° C. under a pressure of $10^{-5}$ mm. Hg. Fed to rats deficient in vitamin A, it is more active than β-carotene and nearly as active as crystallised vitamin A acetate extracted from liver oil.

Example 3

6.2 parts by weight of butoxy-3-methyl-pentene-(2)-yne-(4) (boiling point 71–74° C. under a pressure of 10 mm. Hg and $n_D^{19}=1.4540$) in 10 parts by volume of ether are added dropwise, in the course of 30 minutes, under a nitrogen atmosphere and while stirring, to a solution of ethyl-magnesium bromide, previously prepared from 1 part by weight of magnesium, 4.6 parts by weight of ethyl bromide and 20 parts by volume of ether. On condensing the said compounds with 6 parts by weight of 4-trimethyl-cyclohexenyl-2-methyl-butene-(2)-al-(1), in accordance with the method described in Example 2, 1-butoxy-3,7-dimethyl-6 - hydroxy - 9 - trimethyl-cyclohexenyl-nonadiene - (2,7) - yne-(4) are obtained as a yellowish oil, boiling in high vacuo at 180–184° C. under a pressure of 0.04 mm. Hg. $n_D^{20}=1.512$. Yield: 80 per cent.

In an analogous manner as described in Example 2, this compound is partially hydrogenated in the presence of disactivated palladium charcoal. The 1-butoxy-3,7-dimethyl-6-hydroxy-9-trimethyl-cyclohexenyl-nonatriene-(2,4,7) thus obtained is a yellowish oil, boiling at 168–170° C. under a pressure of 0.09 mm. Hg. $n_D^{20.5}=1.5087$. Yield: 90 per cent.

10 parts by weight of the latter compound in petroleum ether are boiled, as described in Example 2, with 0.15 part by weight of iodine. The reaction mixture is then diluted with petroleum ether, washed with 1-per cent. thiosulphate solution, dried and the vitamin-A-butylether formed is purified by chromatographic percolation effected by means of petroleum ether (boiling point 60–80° C.) on a column of 500-times the quantity of slightly activated aluminum oxide. The butyl ether passes slowly through the column, whereby its position can easily be detected by the intensive yellowish-green fluorescence in the ultraviolet light. The best fraction of the percolation chromatogram is characterized by the greatest stability of the Carr-Price-colour reaction (620 mμ>580 mμ) and by the ultraviolet light absorption spectrum characteristic to vitamin A, having its maximum at 328 mμ ($n_D^{20}=1.576$). The by-products absorbing on a shorter wave length are less adsorbed and get enriched in the first runnings. Unchanged 1-butoxy-3,7-dimethyl-6-hydroxy-9-trimethyl - cyclohexenyl-nonatriene-(2,4,7) adheres to the upper part of aluminum oxide column. It is eluted with methyl alcohol; after evaporation of the solvent, it is once more, exactly in the same manner, subjected to the splitting off of water by means of iodine, whereupon a further quantity of vitamin A butyl ether may be obtained in the percolation chromatogram.

Example 4

7 parts by weight of 1-phenoxy-3-methyl-pentene-(2)-yne-(4) (boiling point 75–78° C. under a pressure of 0.05 mm. Hg $n_D^{22}=1.518$) in 10 parts by volume of ether are added, in the course of 2 hours while stirring, to a boiling magnesium-ethyl-bromide solution, prepared from 1 part by weight of magnesium, 4.6 parts by weight of ethyl bromide and 20 parts by volume of ether. On condensing the said compound with 6 parts by weight of 4-trimethyl-cyclohexenyl-2-methyl-butene-(2)-al-(1) in accordance with the method described in Example 2, 1-phenoxy-3,7-dimethyl-6-hydroxy-9-trimethyl-cyclohexenyl - nonadiene-(2,7)-yne-(4) is obtained as a yellow, viscous oil, boiling at 188–192° C. under a pressure of 0.05 mm. Hg.

In an analogous manner as described in Example 2, the compound is partially hydrogenated by means of deactivated palladium charcoal. The 1-phenoxy-3,7-dimethyl-6-hydroxy-9-trimethyl-cyclohexenyl-nonatriene-(2,4,7) thus obtained is a yellow, viscous oil, boiling in the molecular distillation apparatus, under a pressure of $10^{-5}$ mm. Hg, at 120–130° C.

1 part by weight of the latter compound in 10 parts by volume of toluene is refluxed while introducing nitrogen and excluding light. 0.01 part by weight of crystallised iodine are added, in portions, in the course of 20 minutes. Thereby water is immediately formed which condenses in the reflux condenser. After a further 10 minutes, the reaction mixture is left to cool down, diluted with petroleum ether, washed with 1 per cent. thiosulphate solution and water and the solvent is evaporated. The residue is fractionated in a molecular still. Thus a 10 to 20 per cent. concentrate of the phenyl ether of vitamin A is obtained, which can be purified by chromatographic absorption in the usual manner.

I claim:

1. The compound of the formula

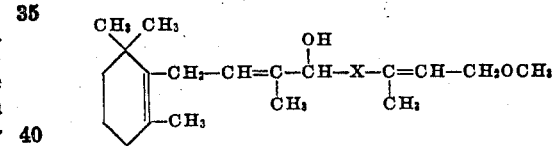

wherein X is selected from the group consisting of the radicals —CH=CH— and —C≡C—.

2. 1-methoxy - 3.7-dimethyl - 6-hydroxy-9-trimethyl-cyclohexenyl-nonadiene-(2,7)-yne-(4).

3. 1-methoxy - 3,7-dimethyl - 6-hydroxy-9-trimethyl-cyclohexenyl-nonatriene-(2,4,7).

4. A process of producing an ether of vitamin A which comprises treating 1-alkoxy-3,7-dimethyl - 6-hydroxy - 9 -trimethyl - cyclohexenyl-nonatriene-(2,4,7) with a minor amount of iodine to effect molecular rearrangement and dehydration to the corresponding ether of vitamin A.

5. A process according to claim 4 carried out in the presence of heat.

6. A process which comprises treating 1-methoxy-3,7-dimethyl- 6 -hydroxy-9-trimethyl-cyclohexenyl-nonatriene-(2,4,7) with a minor amount of iodine to effect molecular rearrangement and dehydration to the corresponding methyl ether of vitamin A.

7. A process according to claim 6 carried out in the presence of heat and an inert solvent.

8. A process which comprises treating 1-alkoxy-3,7-dimethyl-6-hydroxy - 9 - trimethyl-cyclohexenyl-nonatriene-(2,4,7) with a minor amount of iodine to effect migration of the hydroxyl group and to form a 1-alkoxy-3,7-dimethyl-8-hydroxy-9-trimethyl-cyclohexenyl-nonatriene-(2,4,6).

9. A process which comprises treating 1-methoxy-3,7-dimethyl-6-hydroxy - 9 - trimethyl-cyclohexenyl-nonatriene-(2,4,7) with a minor amount of iodine to effect migration of the hydroxyl group and to form 1-methoxy-3,7- dimethyl-8-hydroxy-9-trimethyl - cyclohexenyl - nonatriene-(2,4,6).

10. As new products, 1-alkoxy-3,7-dimethyl-8-hydroxy-9-trimethyl-cyclohexenyl-nonatriene-(2,4,6).

11. 1-methoxy - 3,7 - dimethyl - 8 - hydroxy-9-trimethyl-cyclohexenyl-nonatriene-(2,4,6).

12. A process which comprises hydrogenating 1-alkoxy-3,7-dimethyl-6- hydroxy - 9 - trimethyl-cyclohexenyl-nonadiene-(2,7)-yne-4 to the corresponding triene-(2,4,7) and treating said triene with a minor amount of iodine to effect molecular rearrangement and dehydration to the corresponding ether of vitamin A.

OTTO ISLER.

REFERENCES CITED

The following references are of record in the file of this patent:

UNITED STATES PATENTS

| Number | Name | Date |
| --- | --- | --- |
| 2,369,157 | Milas | Feb. 13, 1945 |
| 2,369,159 | Milas | Feb. 13, 1945 |
| 2,382,086 | Milas | Aug. 14, 1945 |
| 2,412,465 | Milas | Dec. 10, 1946 |

OTHER REFERENCES

Heilbron et al., "Jour. Chem. Soc." 1942 (London), pages 727–733.

Heilbron et al., Ibid 1945 (London), pages 77–81 and 84–94.